United States Patent
Choi et al.

(10) Patent No.: US 8,949,550 B2
(45) Date of Patent: Feb. 3, 2015

(54) MEMORY-CENTERED COMMUNICATION APPARATUS IN A COARSE GRAINED RECONFIGURABLE ARRAY

(75) Inventors: Ki Young Choi, Seoul (KR); Kyung Wook Chang, Daejeon (KR); Jong Kyung Paek, Seoul (KR)

(73) Assignee: SNU R&DB Foundation, Seoul (KR)

(*) Notice: Subject to any disclaimer, the term of this patent is extended or adjusted under 35 U.S.C. 154(b) by 208 days.

(21) Appl. No.: 13/635,620

(22) PCT Filed: Jun. 1, 2010

(86) PCT No.: PCT/KR2010/003495
§ 371 (c)(1),
(2), (4) Date: Sep. 17, 2012

(87) PCT Pub. No.: WO2011/115327
PCT Pub. Date: Sep. 22, 2011

(65) Prior Publication Data
US 2013/0024621 A1    Jan. 24, 2013

(30) Foreign Application Priority Data
Mar. 16, 2010 (KR) .......... 10-2010-0023414

(51) Int. Cl.
G06F 12/08    (2006.01)
G06F 13/00    (2006.01)
G06F 15/78    (2006.01)

(52) U.S. Cl.
CPC .................. *G06F 15/7871* (2013.01)
USPC .......... 711/147; 711/125; 711/202; 711/203; 709/213; 709/214

(58) Field of Classification Search
USPC .................. 711/147; 709/213, 238
See application file for complete search history.

(56) References Cited

U.S. PATENT DOCUMENTS

| | | | | |
|---|---|---|---|---|
| 4,223,291 A | * | 9/1980 | Teichert | 337/303 |
| 4,400,768 A | * | 8/1983 | Tomlinson | 712/2 |
| 4,412,303 A | * | 10/1983 | Barnes et al. | 712/16 |
| 4,644,461 A | * | 2/1987 | Jennings | 718/106 |
| 4,985,832 A | | 1/1991 | Grondalski | |
| 5,081,575 A | * | 1/1992 | Hiller et al. | 710/317 |
| 5,230,079 A | | 7/1993 | Grondalski | |

(Continued)

FOREIGN PATENT DOCUMENTS

| KR | 1988-0004373 A | 6/1988 |
|---|---|---|
| KR | 1020090020952 A | 2/2009 |
| WO | 2006/026086 A2 | 3/2006 |

*Primary Examiner* — John Lane
(74) *Attorney, Agent, or Firm* — Rothwell, Figg, Ernst & Manbeck, P.C.

(57) ABSTRACT

The present invention relates to a coarse-grained reconfigurable array, comprising: at least one processor; a processing element array including a plurality of processing elements, and a configuration cache where commands being executed by the processing elements are saved; and a plurality of memory units forming a one-to-one mapping with the processor and the processing element array. The coarse-grained reconfigurable array further comprises a central memory performing data communications between the processor and the processing element array by switching the one-to-one mapping such that when the processor transfers data from/to a main memory to/from a frame buffer, a significant bottleneck phenomenon that may occur due to the limited bandwidth and latency of a system bus can be improved.

10 Claims, 6 Drawing Sheets

(56) References Cited

U.S. PATENT DOCUMENTS

| | | |
|---|---|---|
| 5,276,895 A | 1/1994 | Grondalski |
| 7,730,280 B2 * | 6/2010 | Pechanek et al. ............... 712/20 |
| 8,688,879 B2 * | 4/2014 | Latta ............................ 710/240 |
| 2007/0033369 A1 * | 2/2007 | Kasama et al. ............... 711/170 |
| 2009/0055565 A1 * | 2/2009 | Latta ............................ 710/240 |
| 2009/0055626 A1 * | 2/2009 | Cho et al. ....................... 712/29 |
| 2009/0083457 A1 | 3/2009 | Kim et al. |
| 2009/0300324 A1 * | 12/2009 | Inuo ............................... 712/17 |
| 2012/0131310 A1 * | 5/2012 | Pechanek et al. ............ 712/203 |
| 2014/0019726 A1 * | 1/2014 | Toi et al. ...................... 712/221 |

\* cited by examiner

MEMORY-CENTERED COMMUNICATION APPARATUS IN A COARSE GRAINED RECONFIGURABLE ARRAY

This application is a National Phase of International Application Serial No. PCT/KR2010/003495, filed Jun. 1, 2010, which claims priority of Korean Patent Application No. 10-2010-0023414, filed on Mar. 16, 2010, incorporated herein by reference in their entireties.

TECHNICAL FIELD

The present invention relates to a coarse-grained reconfigurable array (CGRA), and more particularly, to a memory-centralized communication apparatus in a CGRA, capable of solving a significant bottleneck phenomenon that may occur due to the limited bandwidth and latency of a system bus when a processor or a main memory reads/records data from/into a frame buffer.

The present invention was supported by the National Research Laboratory (NRL) of the Ministry of Education, Science and Technology (MEST) and the Seoul National University (SNU) Research & Development Business (R&DB) Foundation [Project No.: R0A-2008-000-20126-0, Project Title: Reconfigurable MP-SoC Design Technology], and the Seoul R&BD Program of Seoul City and the Kwangwoon University Industry-Academic Collaboration Foundation [Project No.: 10560, Project Title: Industry-Academic Collaboration Innovation Cluster for NanoSoC Industry Promotion].

BACKGROUND ART

Currently, a large number of functional blocks in an embedded system are realized as software for flexibility. However, together with the software, fixed hardware Intellectual properties (IPs) or application-specific integrated circuits (ASICs) reduce flexibility of a whole system but are still used to improve performance.

Coarse-grained reconfigurable arrays (CGRAs) are suggested to improve both flexibility and performance. Typical CGRAs include a reconfigurable array of processing elements (PEs) in order to increase performance due to parallel execution. Each PE is a small-sized execution unit that can be dynamically configured to execute simple operations such as arithmetic or logical operations. Also, interconnection between the PEs may also be dynamically configured for efficient communications. Such dynamic configuration provides flexibility to CGRAs.

DETAILED DESCRIPTION OF THE INVENTION

Technical Problem

The present invention provides a memory-centralized communication apparatus in a coarse-grained reconfigurable array (CGRA), capable of, when a processor transfer data from/to a main memory to/from a frame buffer, solving a bottleneck phenomenon that may occur due to the limited bandwidth and latency of a system bus.

The present invention also provides a memory-centralized communication apparatus in a CGRA, capable of, when an executed application has cyclic data dependency, improving the performance of a whole system by preventing its significant performance reduction that may occur due to the limited bandwidth of a system bus, and by reducing communication overheads.

Advantageous Effects

According to embodiments of the present invention, by using a central memory to set direct communication channels between a processor, a bottleneck phenomenon that may occur due to the limited bandwidth and latency of a system bus in a general CGRA when a processor transfers data from/to a main memory to/from a frame buffer may be solved.

Also, when an executed application has cyclic data dependency, the performance of a whole system may be improved by preventing its significant performance reduction that may occur due to the limited bandwidth of a system bus, and by reducing communication overheads.

Furthermore, area costs of a whole system may be reduced by using a central memory as a scratch pad memory (SPM) including a plurality of memory units each having a single port, instead of a multi-port memory.

BEST MODE

Figure 1:
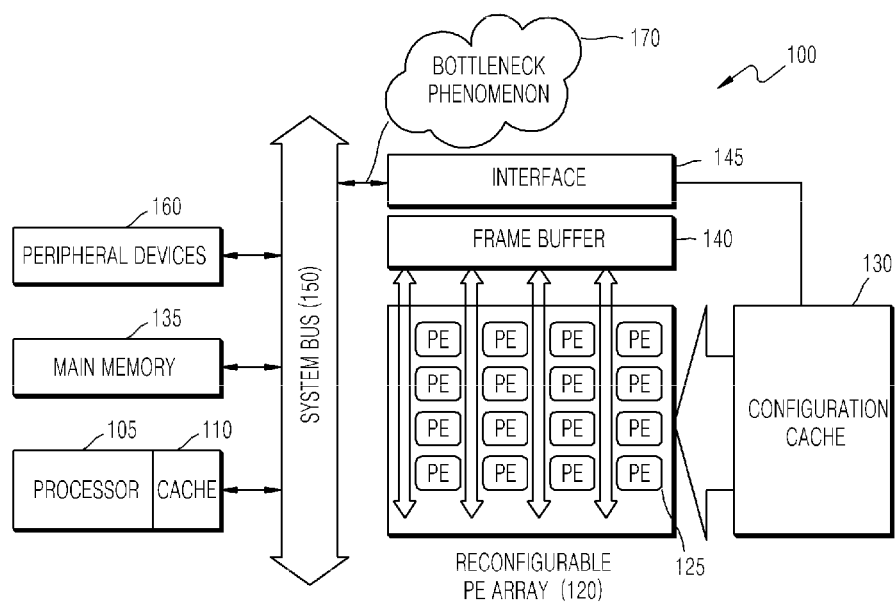
FIG. 1 is a diagram showing a general template of a coarse-grained reconfigurable array (CGRA).

According to an aspect of the present invention, there is provided a memory-centralized communication apparatus in a coarse-grained reconfigurable array (CGRA), the memory-centralized communication apparatus including at least one processor; a processing element (PE) array including a plurality of PEs, and a configuration cache where commands being executed by the PEs are saved; and a central memory including a plurality of memory units forming a one-to-one mapping with the processor and the PE array, and performing data communications between the processor and the PE array by switching the one-to-one mapping.

The memory-centralized communication apparatus may further include a network/bus interface providing an interface between the central memory and an external device.

The central memory may include a plurality of memory units each having a single port; an exclusive region including a cross-bar switch switching one-to-one mapping between each of the memory units, and the processor, the PE array, and the network/bus interface; and a common region realized as a register having multiple ports, where one-to-one mapping information between each of the memory units, and the processor, the PE array, and the network/bus interface is saved.

The processor, the PE array, or the network/bus interface may change the one-to-one mapping information to perform data communications therebetween, and the cross-bar switch may switch the one-to-one mapping between each of the memory units, and the processor, the PE array, and the network/bus interface, according to the changed one-to-one mapping information.

The memory units may use different physical memory but may share the same logical address space.

The common region may save control signals transmitted between the processor, the PE array, and the network/bus interface, or data having a size less than the size preset by a user.

The central memory may be used as a scratch pad memory (SPM) of a processor.

The PE array may further include an address generating unit where a table of base addresses to data being accessed by the PEs is saved.

If a reading or recording request, an index argument, and an offset argument are received from one of the PEs, the address generating unit may find a base address in the table by using the index argument, may generate a full address by adding the base address to the offset argument, and may transmit the reading or recording request and the full address to the central memory.

The processor may include a cache, and, when a memory access request is issued by the processor, the processor may determine whether to access the central memory or the cache, by comparing a requested address to an address range of the central memory.

Each of the memory units may be divided into a plurality of blocks, and each of the blocks may correspond to a column or a row of the PEs, and may have a bandwidth equal to the bandwidth of a data path of the PEs.

MODE OF THE INVENTION

Hereinafter, the present invention will be described in detail by explaining embodiments of the invention with reference to the attached drawings.

FIG. 1 is a diagram showing a general template 100 of a coarse-grained reconfigurable array (CGRA).

Referring to FIG. 1, a reconfigurable processing element (PE) array 120 including a plurality of PEs 125 for parallel calculation is illustrated in two dimensions. The PEs 125 do not have an address generating unit (not shown) and thus have a small size. Accordingly, the PEs 125 manually receive/transmit input/output data from/to a memory called as a frame buffer 140, via a set of data buses that operate on columns of the reconfigurable PE array 120.

As illustrated in FIG. 1, the CGRA typically has two saving units. One is a configuration cache 130 and the other is the frame buffer 140. The configuration cache 130 provides commands (configuration codes) being executed by the PEs 125. The commands include information regarding operations being executed by and interconnection between the PEs 125. The commands also include information regarding a time when data of the frame buffer 140 has to be loaded to a data bus and a time when the data of the data bus has to be saved in the frame buffer 140, and thus the PEs 125 may receive or transmit data without using an additional address generating unit (not shown).

As described above, the configuration cache 130 includes commands being executed by the PEs 125 of the reconfigurable PE array 120. The commands may be saved only during initialization of a system, and thus do not influence the performance of a whole system. However, if the configuration cache 130 does not have a size sufficient to save all commands required by a system, the commands have to be brought from an external device such as a main memory 135 and this causes overheads in bus traffic and performance. However, the overheads may be minimized by using various methods such as prefetching and scheduling.

The frame buffer 140 is used to provide input data to and to save output data from the PEs 125 of the reconfigurable PE array 120. Accordingly, in relation to most multimedia applications, a huge amount of data enters and exits the frame buffer 140. This may cause significant loads in a system bus 150 and controllers such as a processor 105 and a direct memory access (DMA) unit (not shown).

Generally, in the CGRA, since the frame buffer 140 and the reconfigurable PE array 120 are closely connected to each other, communications therebetween do not matter. For example, each column of the reconfigurable PE array 120 in FIG. 1 has its own data bus lines connected to the frame buffer 140 (for example, two lines for reading operands and one line for recording a result), and thus all columns of the reconfigurable PE array 120 may access the frame buffer 140 in parallel. On the other hand, outside the reconfigurable PE array 120, transferring data from/to the main memory 135 to/from the frame buffer 140 by the processor 105 causes a significant bottleneck phenomenon 170 in relation to the performance of a whole system due to the limited bandwidth and latency of the system bus 150. According to a simulation result, communication overheads may be about five times longer than a calculation time of the reconfigurable PE array 120 according to an application.

In the CGRA illustrated in FIG. 1, execution of the reconfigurable PE array 120 may include three steps such as input data loading, calculation, and output data transmission. In the step of input data loading, input data is transmitted to the frame buffer 140. As an operation execution result, the input data may be directly recorded by the processor 105 or may be transmitted from the main memory 135. The reconfigurable PE array 120 starts the step of calculation by bringing the commands from the configuration cache 130 and bringing the input data from the frame buffer 140. Then, the reconfigurable PE array 120 completes the step of calculation by generating and recording output data into the frame buffer 140. In the step of output data transmission, the output data may be processed by the processor 105 or other masters (for example, peripheral devices 160) of the system, or may be copied to the main memory 135 for subsequent use.

The steps of input data loading and output data transmission may cause the following overheads. The frame buffer 140 is designed to allow all columns of the reconfigurable PE array 120 to simultaneously read/record input/output data from/into the frame buffer 140 and thus realizes a large bandwidth for higher-performance calculation. However, reading/recording of data from/into the frame buffer 140 by the system bus 150 causes much more traffic in the system bus 150 of which a bandwidth is limited, and this causes the bottleneck phenomenon 170. The bottleneck phenomenon 170 is more significant when data is transmitted to/from the main memory 135 during the processor 105 and the reconfigurable PE array 120 operate in relation to their data sets.

A double buffering method is useful to reduce communication overheads. However, the double buffering method does not work if an application has cyclic data dependency.

As a case having no cyclic data dependency, for example, it is assumed that operation A is mapped to the processor 105, operation B is mapped to the reconfigurable PE array 120, and operation B has data dependency on operation A while operation A does not have data dependency on operation B. A result of operation A has to be copied from a cache 110 or the main memory 135 via the system bus 150 to the frame buffer 140, which requires a large number of cycles. However, since communication overheads may be reduced by performing double buffering, the double buffering improves throughput of a pipeline system.

Figure 2:
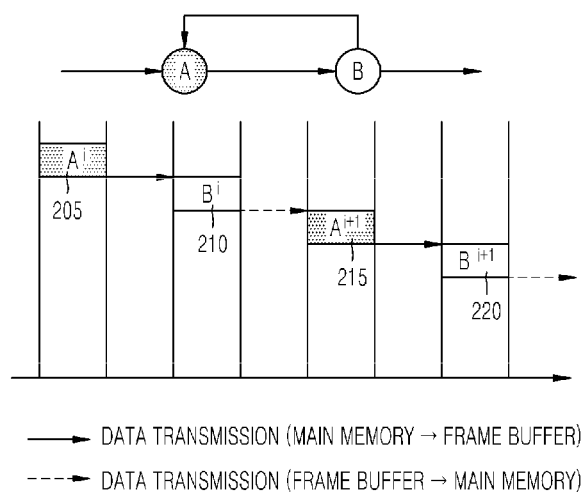
FIG. 2 is a diagram for describing a reduction in system performance caused when an application executed in FIG. 1 has cyclic data dependency.

However, as illustrated in FIG. 2, as a case having cyclic data dependency, for example, it is assumed that operations A 205 and 215 are mapped to the processor 105, operations B 210 and 220 are mapped to the reconfigurable PE array 120, and operations B 210 have data dependency on operations A 205 while operations A 215 have data dependency on operations B 210. In this case, communication overheads may not be reduced by performing double buffering. Due to the above type of application, the limited bandwidth of the system bus 150 may cause a significant performance reduction of a whole system. Accordingly, communication overheads (the lengths of arrows in FIG. 2) have to be reduced to improve the performance of the whole system.

In order to cope with the above problem, the present invention provides a memory-centralized communication apparatus in which data does not pass through the system bus 150 and is transmitted via a scratch pad memory (SPM). In particular, the memory-centralized communication apparatus greatly improves the system performance when communication overheads may not be reduced by double buffering due to cyclic data dependency. For this, the present invention includes a central memory that is closely connected to masters such as the processor 105 and the reconfigurable PE array 120 by performing simple cross-bar switching. Also, in the present invention, in order not to greatly increase area costs, a multi-port memory may not be used and the SPM may be divided and used into a plurality of memory units each having a single port. Furthermore, by forming a one-to-one mapping between the masters and the memory units, the masters may simultaneously access corresponding memory units and thus a much broader bandwidth may be achieved.

The one-to-one mapping may be switched whenever data transmission is required between the masters. This is different from multi-layer buses in that cross-bar switching is statically determined and controlled by the processor 105 without any handshake protocol adjusting an execution time including request-grant signaling. The one-to-one mapping does not change while the masters operate on their own data. Accordingly, each communication channel may realize point-to-point connection between a master and a memory mapped to the master. Meanwhile, with respect to small-sized data and/or control information to be frequently exchanged between masters, an additional small-sized memory may be provided to supplement a large-sized single-port memory.

Figure 3:
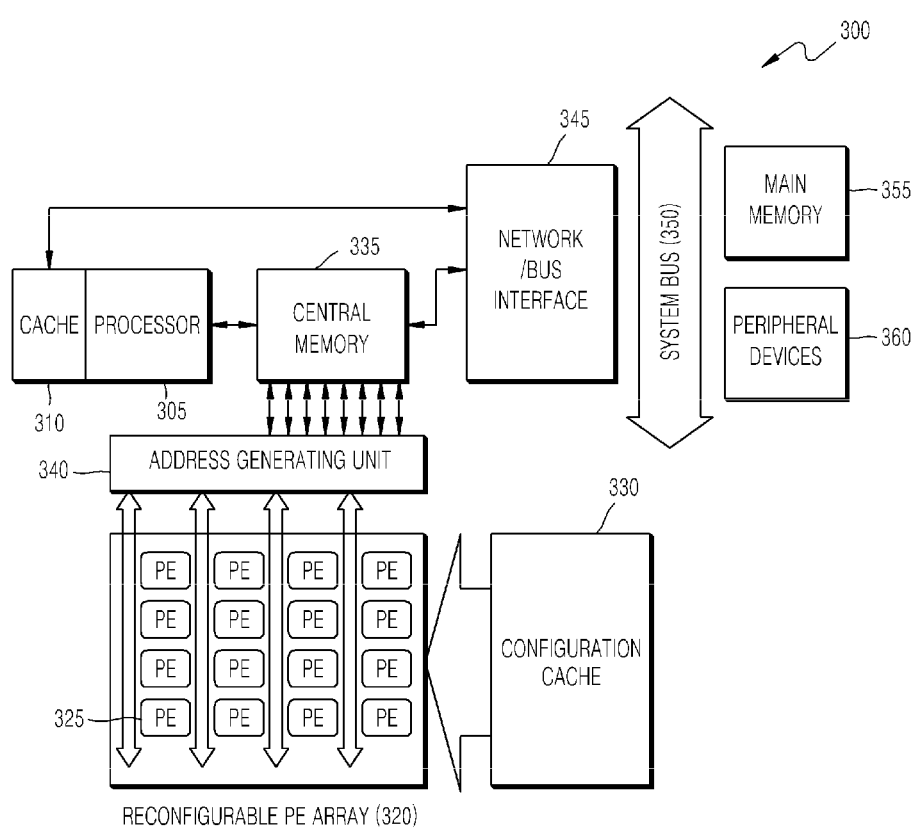
FIG. 3 is a diagram showing a whole system of a CGRA including a memory-centralized communication apparatus, according to an embodiment of the present invention.

FIG. 3 is a diagram showing a whole system of a CGRA including a memory-centralized communication apparatus 300, according to an embodiment of the present invention.

Referring to FIG. 3, the memory-centralized communication apparatus 300 includes a processor 305, a reconfigurable PE array 320, a central memory 335, and a network/bus interface 345.

The processor 305 generally controls the whole system including the CGRA. The processor 305 may include a cache 310, and is connected to the central memory 335 and the network/bus interface 345.

The reconfigurable PE array 320 includes a plurality of PEs 325, a configuration cache 330, and an address generating unit 340.

The reconfigurable PE array 320 includes the address generating unit 340 instead of a frame buffer. If one of the PEs 325 executes a reading/recording operation, a reading/recording request and two arguments (an index argument and an offset argument) are transmitted to the address generating unit 340. After that, the address generating unit 340 generates a full address and a reading/recording request signal so as to allow the central memory 335 to execute an appropriate reading/recording operation.

In order to read/record data, the PEs 325 have to request the address generating unit 340 for reading/recording. Due to limited bit widths, the PEs 325 may not have space for the full address. Accordingly, instead of directly transmitting the full address to the central memory 335 for data transmission, the PEs 325 may transmit two arguments (an index argument and an offset argument in a data address table) to the address generating unit 340 and the address generating unit 340 may access a memory.

The address generating unit 340 may include a table of base addresses to data being accessed by the PEs 325. Slots of the table may be filled by the processor 305 during initialization or execution of the system.

A mechanism generating a full address to the central memory 335 is as described below. Initially, the address generating unit 340 searches for a memory reading/recording request from a control bus regarding each column of the reconfigurable PE array 320. If the memory reading/recording request is received, the address generating unit 340 finds a base address in the table by using the index argument transmitted via a data bus from the PEs 325. After that, the address generating unit 340 generates a full address to the central memory 335 for a reading or recording operation by adding the base address to the offset argument received from the PEs 325.

The network/bus interface 345 provides an interface for interconnection between the central memory 335 and an external device such as a main memory 355 or peripheral devices 360. The main memory 355 and the peripheral devices 360 may be accessed from the central memory 335 via the network/bus interface 345.

Figure 4:
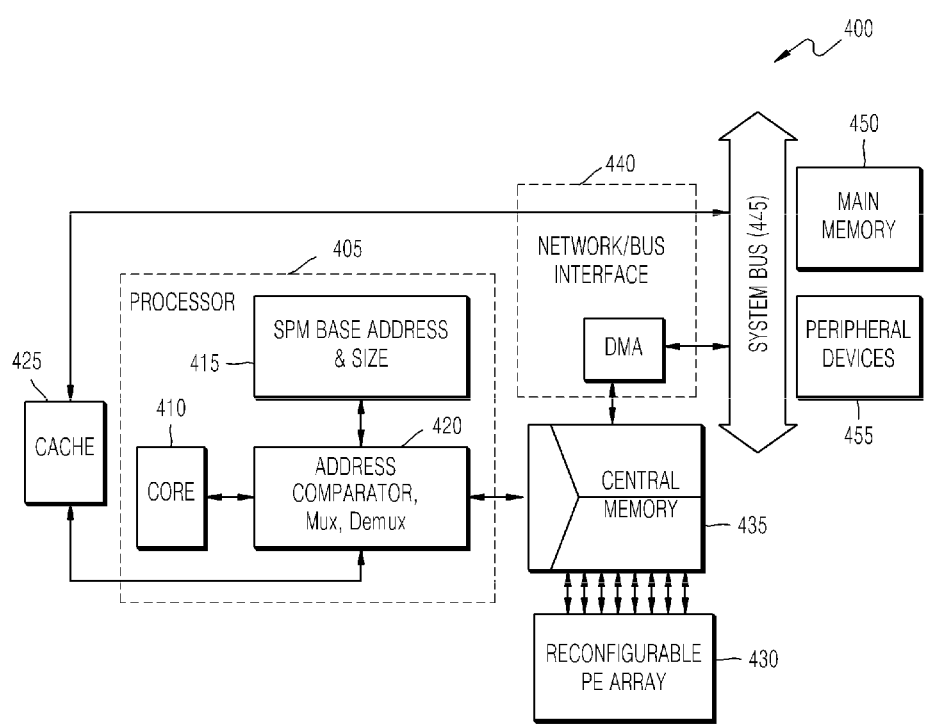
FIG. 4 is a diagram conceptually showing memory hierarchy regarding a processor illustrated in FIG. 3.

FIG. 4 is a diagram conceptually showing memory hierarchy regarding the processor 305 illustrated in FIG. 3.

Referring to FIG. 4, when a memory access request is issued by a processor core 410, in order to determine whether to access a central memory 435 or a cache 425, the processor core_410 compares a requested address to an address range 415 of the central memory 435 by using an address comparator 420. The central memory 435 operates as an SPM of the processor 405, and an access from the processor 405 to the central memory 435 is performed in a single cycle.

On the other hand, a reconfigurable PE array 430 uses the central memory 435 as a frame buffer. Accordingly, the central memory 435 operates as an SPM for the processor 405, and operates as a frame buffer for the reconfigurable PE array 430. A main memory 450 and peripheral devices 455 may be accessed from the central memory 435 via a network/bus interface 440 and a system bus 445.

Referring back to FIG. 3, the central memory 335 is a memory used to achieve direct communication channels between the processor 305, the reconfigurable PE array 320, and the network/bus interface 345. The central memory 335 may include a plurality of memory units (not shown) forming a one-to-one mapping with the processor 305, the reconfigurable PE array 320, and the network/bus interface 345. When the one-to-one mapping is switched, data communications are performed between the processor 305, the reconfigurable PE array 320, and the network/bus interface 345.

Figure 5:
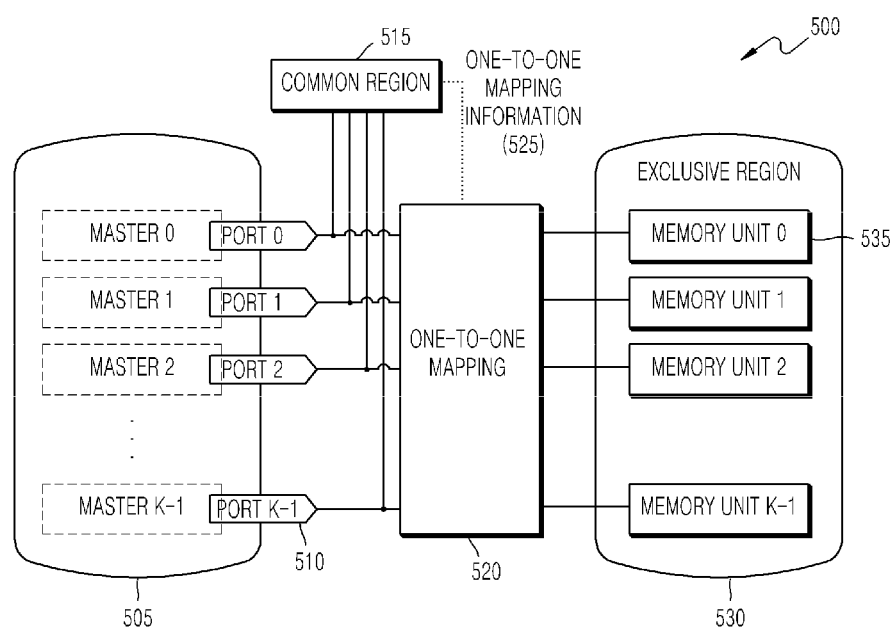
FIG. 5 is a diagram for describing the concept of a central memory, according to an embodiment of the present invention.

FIG. 5 is a diagram for describing the concept of a central memory 500, according to an embodiment of the present invention.

Referring to FIG. 5, data communications are performed via the central memory 500 instead of a system bus. The central memory 500 includes a common region 515, a oneto-one mapping circuit 520 (for example, a cross-bar switch), and an exclusive region 530, and the exclusive region 530 is divided into a plurality of (for example, K; K is an integer) memory units 535 each having a single port. As illustrated in FIG. 5, a plurality of masters 505 (including a processor, a reconfigurable PE array, and a network/bus interface) form a one-to-one mapping with the memory units 535, and each of the masters 505 accesses only one memory unit 535 at a time. Communications between the masters 505 may be performed by merely changing one-to-one mapping information without copying data.

The common region 515 saves configuration information of the central memory 500 which includes one-to-one mapping information 525 between the masters 505 and the memory units 535. Also, control signals transmitted between the masters 505 (mostly for synchronization) or data having a size less than a predetermined size that is preset by a user of a memory-centralized communication apparatus according to an embodiment of the present invention (i.e., small-sized data) may be saved in the common region 515.

The exclusive region 530 may mainly save large-sized data transmitted from one master to another master. The exclusive region 530 is divided into the K memory units 535 according to the number of the masters 505 connected to the central memory 500. Although the one-to-one mapping circuit 520 and the exclusive region 530 are illustrated as separate components in FIG. 5, the exclusive region 530 may include the one-to-one mapping circuit 520.

The K memory units 535 share the same logic addressing space but use different physical memory blocks. Since any system bus is not used in data transmission between the masters 505 and the memory units 535, in order to receive input data and to save output data without bus contention, the central memory 500 allows the masters 505 to simultaneously access the exclusive region 530.

Figure 6:
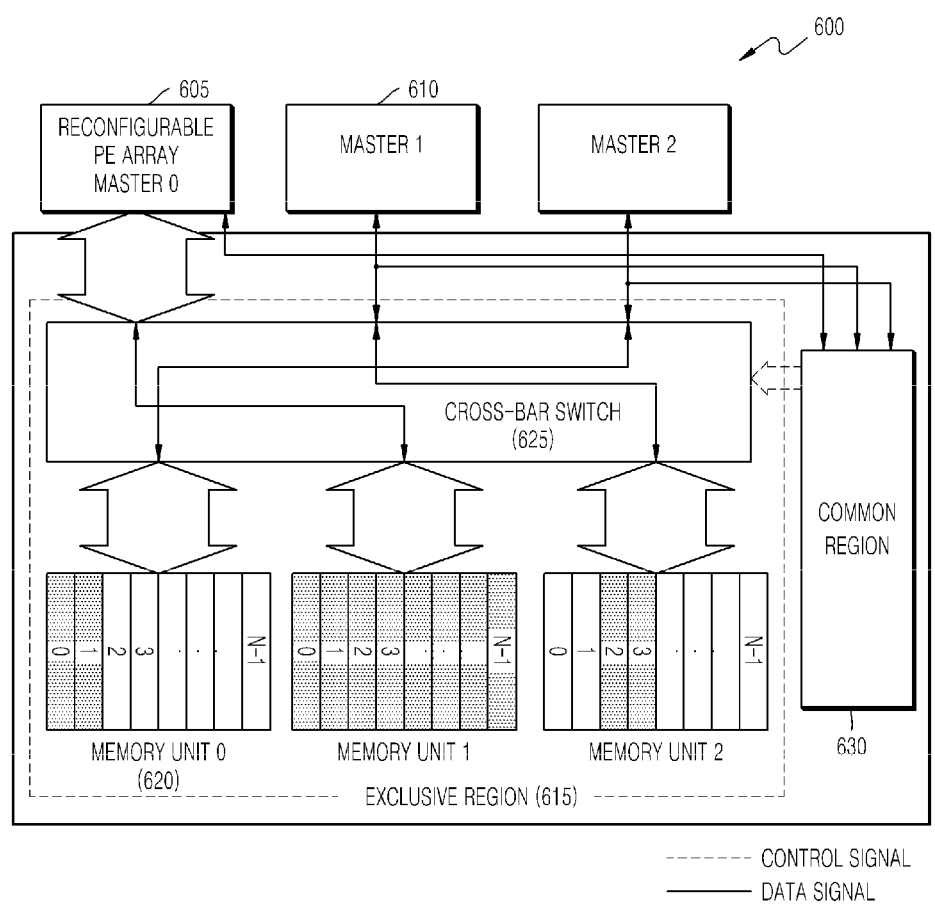
FIG. 6 is a diagram showing a central memory as a working example, according to an embodiment of the present invention.

FIG. 6 is a diagram showing a central memory 600 as a working example, according to an embodiment of the present invention.

Referring to FIG. 6, the central memory 600 includes an exclusive region 615 and a common region 630.

The exclusive region 615 includes a plurality of memory units 620 each having a single port, and a cross-bar switch 625 switching one-to-one mapping between the memory units 620 and masters 610 including a reconfigurable PE array 605, a processor, and a network/bus interface. The switching of the one-to-one mapping may be controlled by, for example, the processor.

The exclusive region 615 may use a plurality of single-port memories instead of one large multi-port memory in order not to increase an area and power overheads. According to a result of comparing an area and power consumption between a central memory including two single-port memories (including a cross-bar switch) and a central memory realized as one dual-port memory, a whole area of the former was less than the whole area of the latter averagely by 22.57%, and dynamic power and leakage power were respectively reduced by 43.09% and 22.15%.

The common region 630 may be realized as a register having multiple ports, and saves one-to-one mapping information between the memory units 620 and the masters 610 including the reconfigurable PE array 605, the processor, and the network/bus interface. Since costs and power consumption of a register having multiple ports file are greatly increased according to its size, it is preferable to minimize the size of the common region 630.

According to another embodiment of the present invention, unlike the other masters 610, the reconfigurable PE array 605 needs to simultaneously bring a plurality pieces of data in one cycle. Accordingly, each of the memory units 620 may be divided into a plurality of (for example, N; N is an integer) blocks, and each of the blocks may be attached to a column of the reconfigurable PE array 605, and may have a bandwidth equal to the bandwidth of a data path of the reconfigurable PE array 605.

In terms of performance, in a communication apparatus according to an embodiment of the present invention, a slight performance reduction may be predicted due to a change in mapping configuration. However, the change in mapping configuration may occur only in one cycle, and does not matter with respect to large-sized data communications. Word-by-word or small-sized data communications may still be dependent upon the common region 630. If, instead, one large-sized multi-port memory is used, overheads caused by changing base address of each masters is larger than merely switching mapping of masters and advantage in performance cannot be expected since the multi-port memory may support only one recording port and two or more masters may not simultaneously record data.

According to an embodiment of the present invention, by physically dividing exclusive regions and using a cross-bar switch, a master may access only one memory unit at a time. Accordingly, a memory collision or a race condition may be prevented, and a memory of another master may not be corrupted.

A memory-centralized communication apparatus capable of reducing communication overheads by using a central memory to set direct communication channels is described above. Instead of data copy between a main memory and a frame buffer in an existing CGRA, the present invention uses only a central memory as communication channels. As such, by switching one-to-one mapping between masters and memory units, an expensive multi-port memory may not be used. According to a result of a test, according to the present invention, communication overheads may be reduced by more than 80% and an overall performance may be improved averagely by 76%.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

The invention claimed is:

1. A memory-centralized communication apparatus in a coarse-grained reconfigurable array (CGRA), the memory-centralized communication apparatus comprising:

at least one processor;

a processing element (PE) array comprising a plurality of PEs, and a configuration cache where commands being executed by the PEs are saved; and a central memory comprising a plurality of memory units forming a one-to-one mapping with the processor and the PE array, and performing data communications between the processor and the PE array by switching the one-to-one mapping;

wherein the central memory is used as a scratch pad memory of the processor and is used as a frame buffer of the PE array, wherein the PE array further comprises an address generating unit that generates a full address to the central memory using arguments received from the PEs.

2. The memory-centralized communication apparatus of claim 1, further comprising a network/bus interface providing an interface between the central memory and an external device.

3. The memory-centralized communication apparatus of claim 2, wherein the central memory comprises:
   a plurality of memory units each having a single port;
   an exclusive region comprising a cross-bar switch switching one-to-one mapping between each of the memory units, and the processor, the PE array, and the network/bus interface; and
   a common region realized as a register having multiple ports, where one-to-one mapping information between each of the memory units, and the processor, the PE array, and the network/bus interface is saved.

4. The memory-centralized communication apparatus of claim 3, wherein the processor, the PE array, or the network/bus interface changes the one-to-one mapping information to perform data communications therebetween, and
   wherein the cross-bar switch switches the one-to-one mapping between each of the memory units, and the processor, the PE array, and the network/bus interface, according to the changed one-to-one mapping information.

5. The memory-centralized communication apparatus of claim 4, wherein the memory units use different physical memory but share the same logical address space.

6. The memory-centralized communication apparatus of claim 3, wherein the common region saves control signals transmitted between the processor, the PE array, and the network/bus interface, or data having a size less than the size preset by a user.

7. The memory-centralized communication apparatus of claim 3, wherein each of the memory units is divided into a plurality of blocks, and each of the blocks corresponds to a column or a row of the PEs, and has a bandwidth equal to the bandwidth of a data path of the PEs.

8. The memory-centralized communication apparatus of claim 1, wherein the PE array further comprises an address generating unit where a table of base addresses to data being accessed by the PEs is saved.

9. The memory-centralized communication apparatus of claim 8, wherein, if a reading or recording request, an index argument, and an offset argument are received from one of the PEs, the address generating unit finds a base address in the table by using the index argument, generates a full address by adding the base address to the offset argument, and transmits the reading or recording request and the full address to the central memory.

10. The memory-centralized communication apparatus of claim 1, wherein the processor comprises a cache, and wherein, when a memory access request is issued by the processor, the processor determines whether to access the central memory or the cache, by comparing a requested address to an address range of the central memory.

* * * * *